(12) United States Patent
Cabrera et al.

(10) Patent No.: US 7,676,812 B2
(45) Date of Patent: Mar. 9, 2010

(54) LARGE SCALE EVENT NOTIFICATION SYSTEM

(75) Inventors: Luis Felipe Cabrera, Bellevue, WA (US); Umesh Madan, Bellevue, WA (US); John P. Shewchuk, Redmond, WA (US); David Alan Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1720 days.

(21) Appl. No.: 10/166,297

(22) Filed: Jun. 10, 2002

(65) Prior Publication Data

US 2003/0229674 A1 Dec. 11, 2003

(51) Int. Cl.
*G06F 9/54* (2006.01)
(52) U.S. Cl. .................................. 719/318; 709/207
(58) Field of Classification Search ................. 719/318; 709/207
See application file for complete search history.

(56) References Cited

U.S. PATENT DOCUMENTS

| | | | |
|---|---|---|---|
| 6,363,435 B1 * | 3/2002 | Fernando et al. ............ | 719/318 |
| 6,446,136 B1 * | 9/2002 | Pohlmann et al. ........... | 719/318 |
| 6,502,133 B1 * | 12/2002 | Baulier et al. ............... | 709/224 |
| 6,681,230 B1 * | 1/2004 | Blott et al. ............... | 707/104.1 |
| 6,772,418 B1 * | 8/2004 | Morris ....................... | 719/318 |
| 6,950,825 B2 * | 9/2005 | Chang et al. ................ | 707/100 |
| 2002/0042830 A1 * | 4/2002 | Bose et al. .................. | 709/230 |
| 2003/0012216 A1 * | 1/2003 | Novaes ....................... | 370/432 |
| 2003/0014391 A1 * | 1/2003 | Evans et al. .................... | 707/1 |
| 2003/0074446 A1 * | 4/2003 | Musante et al. ............. | 709/224 |
| 2003/0120720 A1 * | 6/2003 | Montero ..................... | 709/203 |
| 2003/0188198 A1 * | 10/2003 | Holdsworth et al. ........ | 713/201 |

* cited by examiner

*Primary Examiner*—Li B Zhen
(74) *Attorney, Agent, or Firm*—Workman Nydegger

(57) ABSTRACT

A scalable event notification system is provided. The event notification system manages the set of topics available for notification via a topic manager network. The event notification system transmits event notifications to event consumers via a subscription manager network. The configuration and operation of the subscription manager network may to reconfigured in response to changing load and fault conditions to facilitate the timely delivery of event notifications. The notification to subscribers also includes mechanisms to provide individual privacy and non-tampering of notifications. Notification may dynamically be delivered to alternative locations and localized to accommodate different natural languages.

28 Claims, 7 Drawing Sheets

Address: http://www.eventsubscribe.com

Enter Subscription Information

Topics: business news, sports

Subscription duration: 6 months

Event notification duration: 2 hours

Location
    Geographic: Chicago

Terminal device: Mobile telephone

IP Address: 11.22.33.44

Language: English

Security Protocol: symmetric key

[ Send ]  [ Clear ]

LARGE SCALE EVENT NOTIFICATION SYSTEM

BACKGROUND OF THE INVENTION

1. Field of the Invention

The present invention relates to the field of event notification systems. More particularly, the invention provides an event notification system that provides rapid notifications in large-scale networks.

2. Description of Related Art

Event notification systems provide content and information to entities connected to an event notification source. In one prior art example, current news events are delivered to users connected to the Internet. Each user subscribes to the event notification source. When the event notification source becomes aware of a current news event, the event notification source reviews the list of subscriptions and sends an event notification to each subscribed user.

Typical wide area network (WAN) event notification systems include single source distribution trees and distribution trees having fixed structures. For example, an event notification is generated at a single node and then distributed throughout the tree in a predetermined manner. Drawbacks of such systems are that the rigid distribution mechanisms do not compensate for changing load conditions or allow users to customize delivery features. One example is a news event service that transmits news alerts through a network to a group of subscribers. Some nodes may experience overloading while other nodes are underutilized. As a result it can take up to a week for all of the subscribers to receive the news alert.

Existing local area network (LAN) event notification systems sometimes provide rapid event notifications to all subscribers. Such systems utilize the underlying broadcast communication mode of the network transport. As a result, existing LAN event notification systems are not scalable and cannot be used with wide area networks.

There exists a need in the art for a flexible event notification system that provides efficient event notifications to users connected to a wide area or large-scale network.

BRIEF SUMMARY OF THE INVENTION

The present invention overcomes one or more problems and limitations of the prior art by providing a scalable event notification system. Event sources generate event notifications and transmit the event notifications to a topic manager. The topic manager may then assign the event notification to a topic. The event notification and corresponding topic classification may be transmitted to a subscription manager. The subscription manager may be implemented with a network of subscription managers that are configurable to increase reliability and on-time delivery of event notifications.

BRIEF DESCRIPTION OF THE DRAWINGS

The present invention is illustrated by way of example and not limited in the accompanying figures in which like reference numerals indicate similar elements and in which:

FIG. 2A illustrates a user interface screen that may be used by event consumers to enter subscription information.

DETAILED DESCRIPTION OF THE INVENTION

Aspects of the present invention are suitable for use in a variety of distributed computing system environments. In distributed computing environments, tasks may be performed and information may be exchanged by remote computer devices that are linked through communications networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include handheld devices, multiprocessor systems, microprocessor-based or programmable consumer electronics, network PCS, minicomputers, mainframe computers, mobile telephones, personal digital assistants and the like.

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
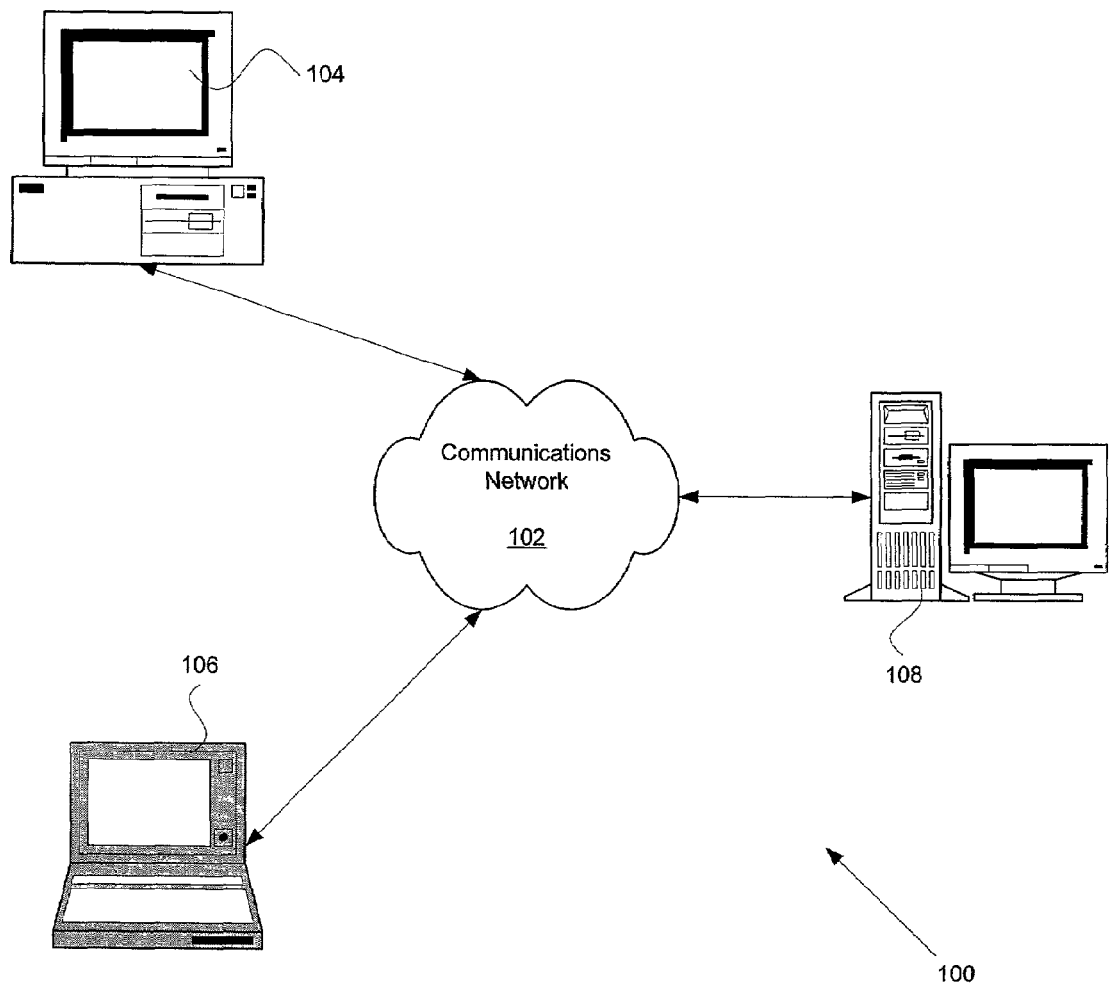
FIG. 1 illustrates an exemplary distributed computing system operating environment.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services. Systems may also include more than one communication network, such as a LAN coupled to the Internet.

Computer device 104, computer device 106 and computer device 108 may be coupled to communications network 102 through communication devices. Network interfaces or adapters may be used to connect computer devices 104, 106 and 108 to a LAN. When communications network 102 includes a WAN, modems or other means for establishing a communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed.

Computer devices 104, 106 and 108 may exchange content, applications, messages and other objects via communications network 102. In some aspects of the invention, computer device 108 may be implemented with a server computer, a hierarchical network of server computers or a server farm. Computer device 108 may also be configured to provide services to computer devices 104 and 106.

Figure 2:
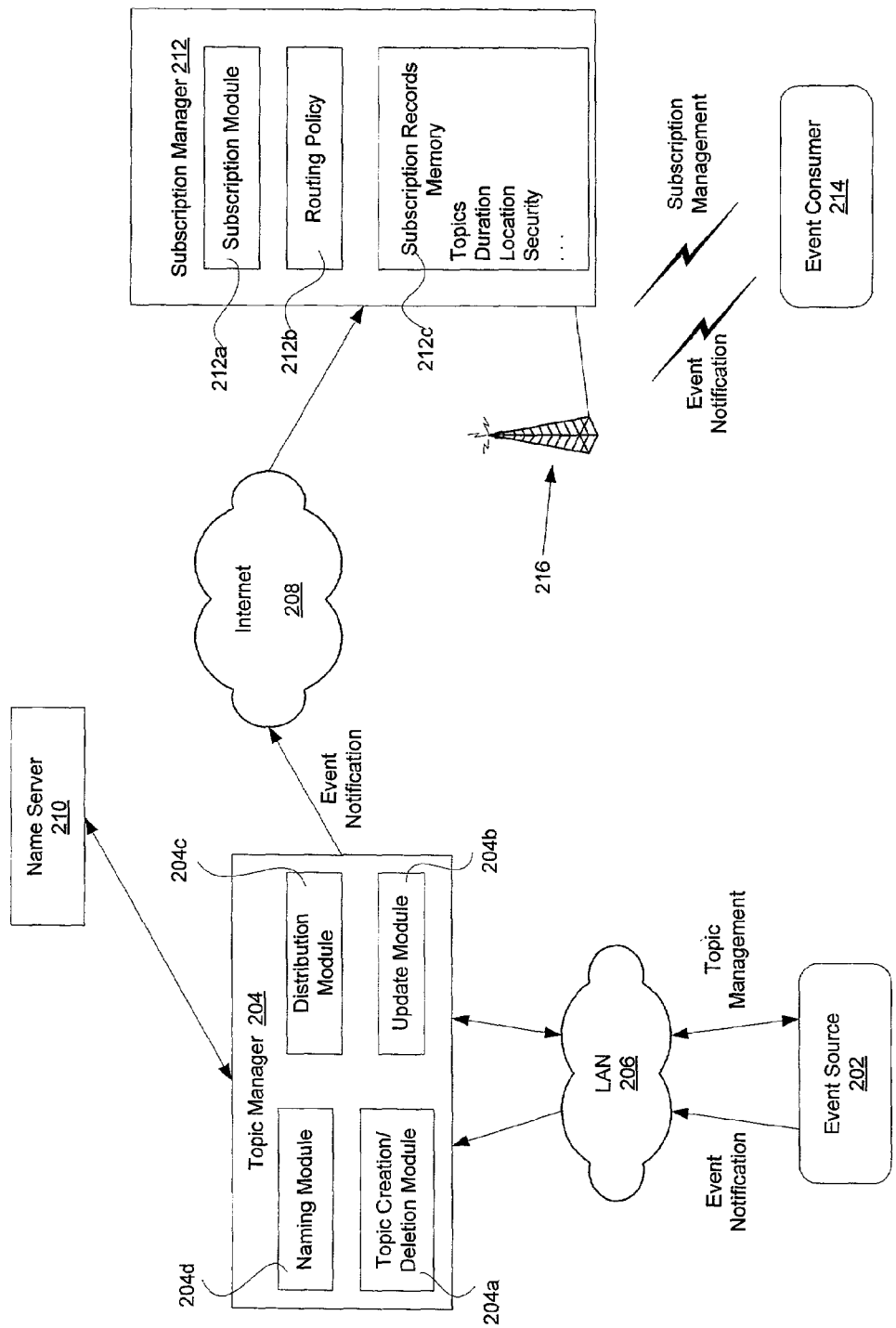
FIG. 2 illustrates a wide area network event notification system in accordance with an embodiment of the invention.

FIG. 2 illustrates an event notification system in accordance with an embodiment of the invention. An event source 202 generates event notifications. Event source 202 may be implemented with a variety of different hardware and software components. For example, event source 202 may be implemented with a printer, or a computer workstation. Event source 202 transmits event notifications to a topic manager 204. FIG. 2 shows an embodiment in which event source 202 is coupled to topic manager 204 via a local area network (LAN) 206. One skilled in the art will appreciate that the network connections shown in FIG. 2 are merely illustrative and that a variety of alternative connections may be utilized. For example, event source 202 may be coupled to topic manager 204 via the Internet 208 instead of local area network 206. Moreover, the coupling of event source 202 to topic manager may be dynamic and change over time.

An event notification may include a record of an observed event. For example, when event source 202 is a printer, the printer may transmit an event notification indicating that the printer is out of paper or that the toner is low. When event source 202 is implemented with a workstation, event source 202 may transmit an event notification in the form of a news article. Events may also be derived from devices. For example, an event may be derived from the reading of a temperature at a thermometer or the reading of the water precipitation at a pluviometer. Events could also be dynamic news such as the notification of a traffic jam or a traffic accident.

Topic manager 204 may include modules for managing and distributing topics throughout a network of topic managers. A creation/deletion module 204a may be included to manage topics. In one embodiment, topics are identified by uniform resource locators (URLs) and event source 202 may exchange topic management messages with topic creation/deletion module 204a to create or delete topics. For example, when event source 202 creates an event notification in the form of a news article relating to Microsoft® stock, topic creation/ deletion module 204a may create a topic in the form of the URL SOAP://Reuters/stocks/MS. One of the advantages of naming a topic with a URL is that it facilitates creating topics in a distributed fashion while still providing a unique identification of the topic.

A topic update module 204b may be included to update topic information, such as changing the hierarchal structure of URLs used to identify the topics. In the example given above, when there are several different articles relating to Microsoft's®stock, topic update module 204b may define new topics that are more specific, such as SOAP://Reuters/ stocks/MS/earnings. Topic update module 204b may also be used to aggregate topics. For example, a summary topic may be identified by a prefix in a URL that is used to identify all topics that are extensions of the summary topic.

A distribution module 204c may include a policy for load balancing of a hierarchal network of topic managers. FIG. 2 shows a single topic manager 204. In alternative embodiments, topic manager 204 may be implemented with several different servers that work together to perform the functions of topic manager 204. A policy may be included for performing load balancing based on the use of the individual servers, geography or other factors. The structure and operation of such a distributed topic manager will be apparent after the description of the distributed subscription manager illustrated in FIG. 3.

Event notifications may also be identified by URLs. A single event name can represent a document, a topic, a hardware or software state or any other event. In one embodiment of the invention, the type of event may be identified by an action field in an application that includes a markup language, such as the extensible markup language (XML). Topic manager 204 may include a naming module 204d. Naming module 204d may communicate with a name server 210 to convert URLs to physical machine addresses, such as Internet protocol addresses. For example, naming module 204d may transmit the URL SOAP://Reuters/docs/MS to name server 210 and name server 210 may return the Internet protocol addresses 11.222.33.44. This allows topics to be dynamically hosted on different servers by changing the logical to physical association in name server 210.

In one embodiment, name server 210 may be implemented with a network of distributed name servers. A first name server resolves part of the URL and forwards the message to a destination corresponding to the resolved part of the URL. The destination, if it is another name server, resolves a next part of the URL, and the process continues until the physical destination endpoint is resolved. With this embodiment, the functions of the individual name servers can be performed at different locations and can be moved between the name servers.

Topic manager 204 may transmit event notifications to a subscription manager 212 via the Internet 208. In alternative embodiments, the functions of topic manager 204 and subscription manager 212 may be performed with a single computer device. FIG. 2 shows an event consumer 214 coupled to subscription manager 212 via a wireless link 216. The coupling of event consumer 214 to subscription manager 212 may be dynamic and change over time. Subscription manager 212 may include a subscription module 212a that creates, deletes and modifies subscriptions. A routing policy 212b may be included for distributing subscription information and event notifications through a network of subscription managers. Routing policy 212b is described in detail with respect to FIG. 3. Subscriptions may be stored in a subscriptions records memory 212c and may include information such as the topics that are subscribed to, the durations of the subscriptions, the locations of the event consumers and any desired security protocols.

FIG. 2A shows an exemplary user interface screen 220 that may be used by an event consumer to enter and modify subscription information. Subscription information may include the identification of topics, subscription duration, event notification duration, language, security protocol, delivery address, etc. When the subscribed language does not correspond to the natural language of the event source, an automated translation function may be performed to an event notification between the event source and the event consumer. Instead of providing a single delivery address, the event consumer may provide 2 or more delivery addresses and a corresponding priority order. In an alternative embodiment, an event consumer may provide key words and topics will be chosen accordingly by the subscription manager. Location information may include a geographic location of the user, the identification of a type of terminal device and an address of the user's terminal device. Name server 210 may store the address of a terminal device that corresponds to the URL of the event consumer. Subscription manager 212 may retrieve the address before sending an event notification.

The security protocol may identify an encryption scheme that will be used for exchanging information with the event consumer. For example, a first event consumer may choose to receive messages encrypted with a symmetric key, while a second event consumer may choose to utilize a public/private key scheme for exchanging information.

Additional attributes may be added to further customize the delivery of event notifications. For example, the event consumer may choose to receive a guaranteed delivery of event notifications or that the subscription manager merely use best efforts. An event consumer may also choose to receive event notifications via e-mail, instant messaging, pager, etc. In effect, each consumer can customize the delivery of notifications, such that different consumers receive the same notification differently.

In an illustrative operation, event source 202 may generate an event notification and transmit the event notification to topic manager 204. Topic manager 204 may then classify the event notification into an existing topic. The classification may include comparing attributes of the event notification to a list of topics. For example, an event notification that includes information relating to the toner state of a printer may be classified under a printer topic or a printer/toner topic. Topic manager 204 may then locate and transmit the event notification to a subscription manager 212.

In some embodiments, topic manager 204 must locate a root subscription manager for the given topic. In a collection of subscription managers for a topic, the root subscription manager is the one that feeds the other subscription managers. For example, see root subscription manager 302 in FIG. 3. Subscription manager 212 may then determine which event consumers have subscribed to the indicated topic and then transmit the event notification to the subscribed event consumers in accordance with the individual subscriptions. A first event consumer may receive a fax within a guaranteed delivery time, a second event consumer may receive the event notification on a pager and a third event consumer may receive an e-mail message encrypted with a symmetric key.

Figure 3:
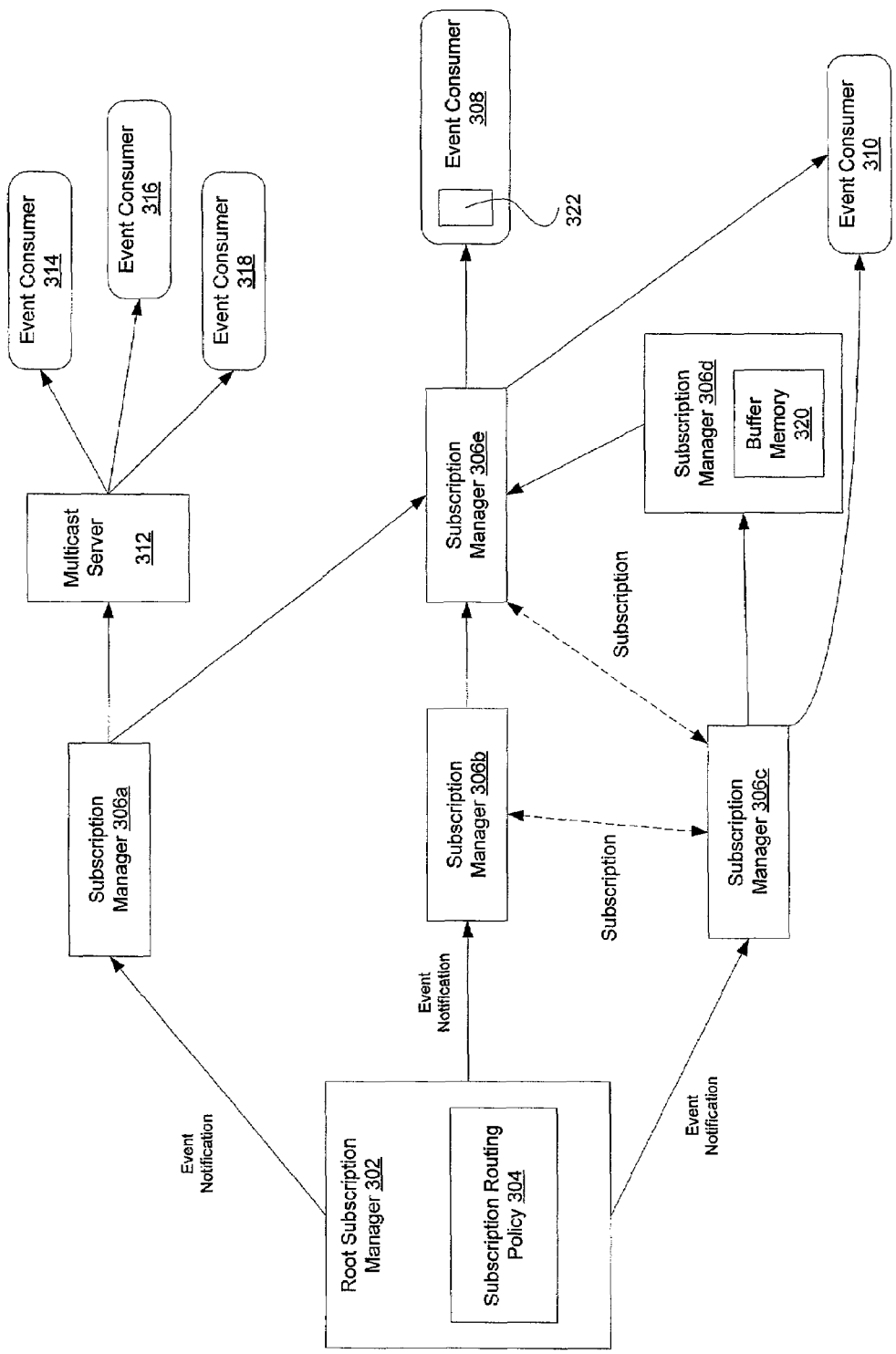
FIG. 3 illustrates a hierarchical subscription manager network in accordance with an embodiment of the invention.

FIG. 3 illustrates a subscription manager network in accordance with an embodiment of the invention. A root subscription manager 302 is shown coupled to a next level of subscription managers 306a, 306b and 306c. A subscription manager 306e is the last subscription manager between root subscription manager 302 and event consumer 308. In one embodiment of the invention, subscription manager 302 may transmit an event notification intended for event consumer 308 to more than one of the next level subscription managers. For example, FIG. 3 shows an event notification transmitted to subscription managers 306a, 306b and 306c. Transmitting the same event notification through more than one path facilitates the timely delivery of event notifications even when one of the paths is congested or experiences a fault condition. For example, the path from root subscription manager 302 through subscription managers 306b and 306e may become congested and introduce a significant delay in the transmission of an event notification. At the same time, the path through subscription manager 306a may not be congested and provide for the rapid delivery of event notifications. The subscription manager at the last hop between the subscription manager network and the event consumer may track all event notifications to ensure that an event consumer does not receive more than one copy of the same event notification.

Subscription information provided by event consumers may be distributed throughout the network of subscription managers. The selection of which subscription manager to host a subscription may be based on the geographic locations of the event consumer and subscription managers, topics assigned to subscription managers or other factors. Regardless of where subscriptions are hosted, the event consumers perceive a single subscription manager and may be unaware of when their subscription is transferred from one subscription manager to another subscription manager. For example, suppose that several subscribers located in Seattle subscribe to a "breaking news" event notification topic, which transmits short news alerts to the subscribers when they occur. Suppose that other subscribers located in Washington, D.C. also subscribe to the same topic. According to one embodiment of the invention, each subscription is routed to a root subscription manager, which then assigns the subscriptions to local subscription managers in the respective geographic region. The Seattle subscribers are assigned to a subscription manager located in the Seattle region, and the Washington subscribers are assigned to a subscription manager located in the Washington region. When an event notification occurs, the event is transmitted to the respective Seattle and Washington subscription managers, which then transmit the event notification (using the appropriate policy for each subscription) to the respective subscribers in each region. This avoids the need for the root subscription manager to directly transmit to all subscribers.

While not shown in FIG. 3, some or all of subscription managers 306a, 306b, 306c, 306d and 306e may exchange status messages with root subscription manager 302. Subscription routing policy 304 may then analyze the state of the network and dynamically adjust to load and error conditions. For example, subscription manager 306c may become inoperative or overloaded. Subscription routing policy 304 may then cause the transfer of subscription information relating to event consumer 310 from subscription manager 306c to subscription managers 306b and 306e. In embodiments that transmit only a single event notification through the subscription manager network, event notifications will then be transmitted to subscription manager 306b and 306e to event consumer 310. Subscription routing policy 304 thus allows the subscription manager network to respond to changing load and fault conditions while maintaining timely delivery of event notifications to event consumers. In addition to identifying event notifications by URLs, each of the subscription managers may also be identified by a URL to facilitate the use of subscription routing policy 304 for managing subscription and routing information.

In one embodiment of the invention, one or more of the subscription managers may transmit information to a higher-level or peer subscription manager to indicate the load condition of the subscription manager and/or request to receive more event notification traffic. For example, subscription manager 306a may be underutilized and request more event notification traffic to optimize the overall throughput of the subscription manager network.

FIG. 3 shows an embodiment in which a storage device, buffer memory 320, is coupled to or included in a subscription manager 306d. Buffer memory 320 may be located at an intermediate node to accelerate delivery of event notifications and/or to provide reliable delivery of event notifications. Buffer memories may be added at locations to compensate for slow or limited bandwidth links. Selectively storing packets or event notifications before transmitting to another link may reduce collisions and the requirement for retransmittion of packets and event notifications.

FIG. 3 also shows an embodiment in which a multicast server 312 is coupled between a subscription manager 306a and event consumers 314, 316 and 318. The disclosed subscription manager network may be in the form of an overlay network including dedicated servers or other components and may also exploit specialized networking and routing hardware. For example, when event consumers 314, 316 and 318 are coupled to multicast server 312, subscription routing policy 304 or subscription information stored in root subscription manager 302 or subscription manager 306a may indicate that event notifications are to be transmitted to event consumers 314, 316 and 318 via multicast server 312.

One or more of the event consumers shown in FIG. 3 may include a local filter for filtering event notifications. Event consumer 308 includes such a filter 322. Filtering some or all of the event notifications locally at event consumers reduces the processing requirements of nodes in the subscription manager network and can optimize delivery time. For example, all possible event notifications may be transmitted to event consumer 308 and filtered locally by filter 322 according to the subscriptions of event consumer 308. Of course, subscription routing policy 304 may be modified or adapted so that some event consumers locally filter event notifications and others do not. As a result, the routing policy can adapt to and compensate for processing delays and fault conditions that may impact event notification delivery times. Processing delays may result from overloaded nodes and a fault condition may result from an inoperative node.

Figure 4:
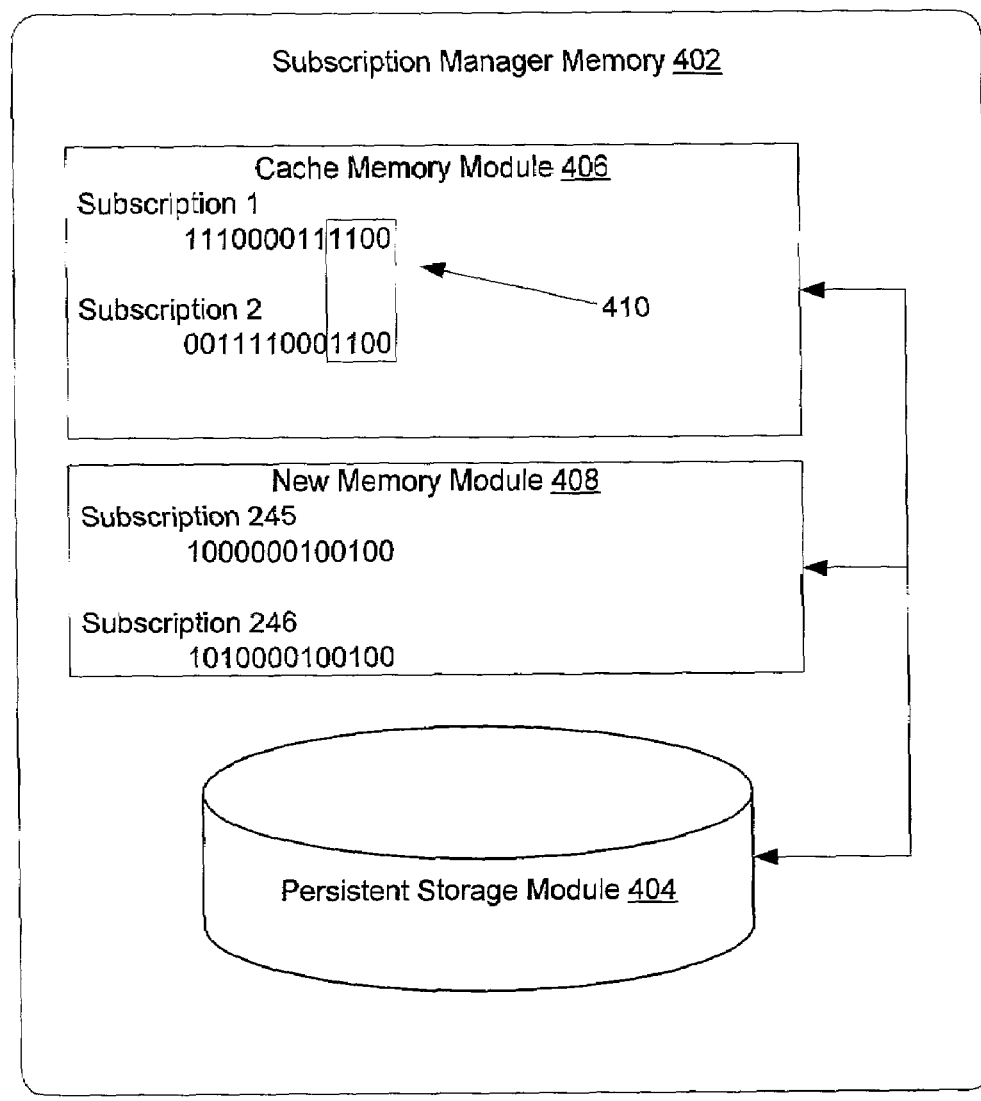
FIG. 4 illustrates a memory capable of storing data in a cache memory module for extended periods of time, in accordance with an embodiment of the invention.

FIG. 4 shows a subscription manager memory 402 in accordance with an embodiment of the invention. Subscription manager memory 402 includes a persistent storage memory 404, a cache memory module 406 and a new memory module 408. Persistent storage memory 404 may be used permanently store subscription information and may be implemented with a hard disk drive, optical disk drive or other persistent storage means. Cache memory module 406 may retrieve subscription information from persistent storage memory 404 and may be implemented with a random access memory (RAM) or other memory device that can provide for the relatively rapid retrieval of the stored content.

Subscription information stored in subscription manager memory 402 includes unused reserved fields 410 that may be updated after the subscriptions have been retrieved from persistent storage memory 404. Unused reserved fields 410 may be used to reflect changes in subscription information without requiring a change in the size of the subscription records. For example, the last bit may be changed from a 0 to a 1 when the subscription has been deleted or cancelled. The inclusion of the unused reserved fields allows the subscription information contained in cache memory module 406 to be utilized for relatively long periods of time without requiring that the length of the records be modified or downloading information from persistent storage memory 404. Thus, the time consuming steps of transferring content from persistent storage memory 404 to cache memory module 406 can be reduced. New subscription information may be added to new memory module 408. Of course, cache memory module 406 may be structured so that new subscriptions information may be added directly to cache memory module 406. The memory structure shown in FIG. 4 may be used in applications that do not include subscription managers.

Figure 5:
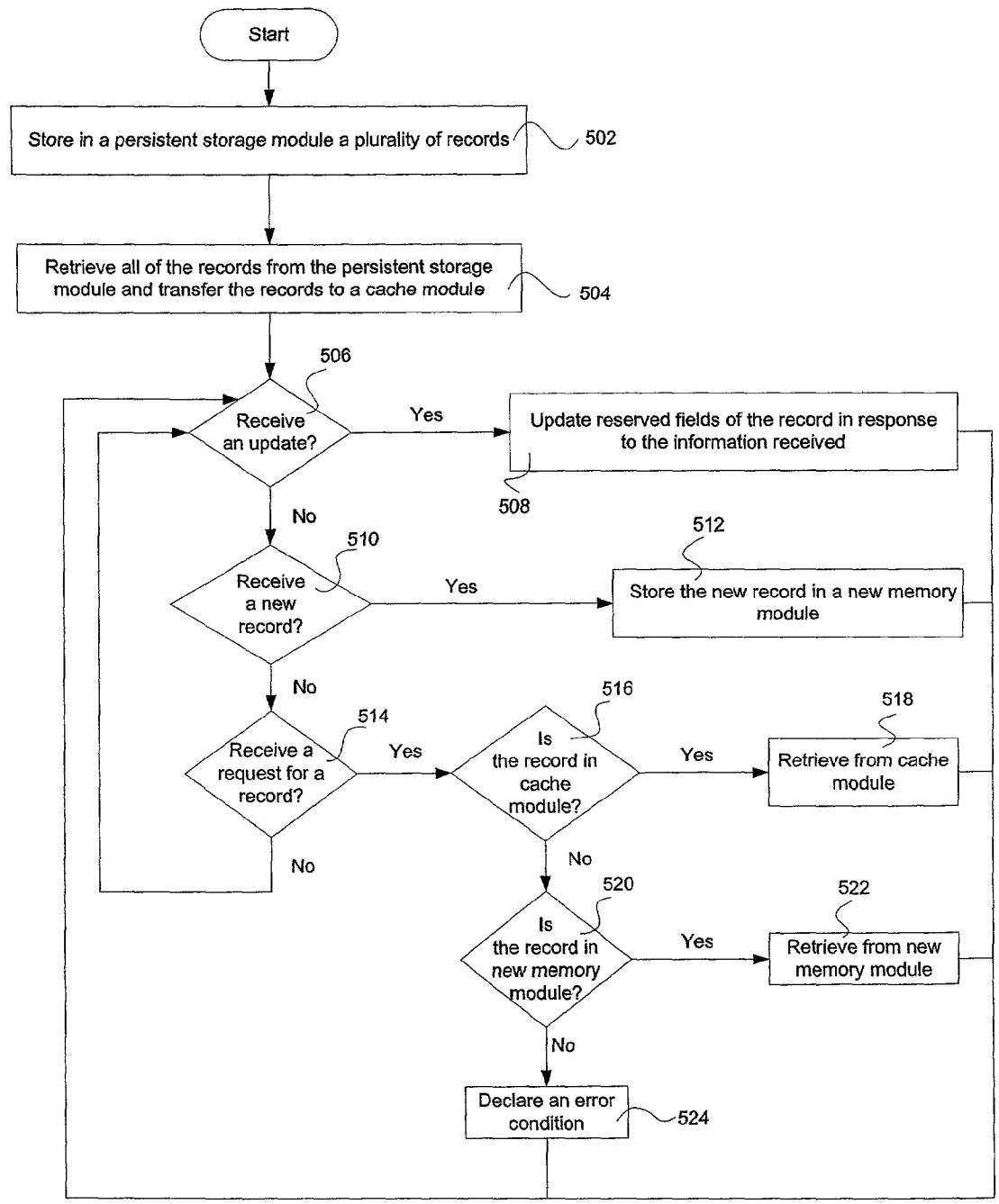
FIG. 5 illustrates a method of operating a memory that includes a persistent storage module and a cache memory module, in accordance with an embodiment of the invention.

FIG. 5 illustrates a method of operating a memory module, such as subscription manager memory 402 shown in FIG. 4. First, in step 502, a plurality of records are stored in a persistent storage module. Next, in step 504 all of the records are retrieved from the persistent storage module and transferred to a cache memory module. In step 506, it is determined whether or not update information was received at the memory module. An update may include changes to an existing subscription, cancellation of an existing subscription or any other modifications. When an update is received, in step 508, one or more of the unused reserved fields of the subscription record is updated to reflect the new information. Next, in step 510 it is determined whether a new record is received. The new record may be a new subscription that is received after the existing subscriptions have been transferred from the persistent storage module to the cache memory module. When a new record is received in step 512, the new record is stored in a new memory module. The new memory module may be implemented with a random access memory or any other type of memory.

In step 514, it is determined whether a request for a record is received. The request may be received when subscription information is needed, such as when a subscription manager is comparing an event notification to subscriptions. When a request for a record is received, in step 516 it is first determined whether the record is in the cache memory module. When the record is in the cache memory module, in step 518 the record is retrieved from the cache memory module. When the record is not in the cache memory module, in step 520 it is determined whether the record is in the new memory module. When the record is in the new memory module, in step 522 the record is retrieved from the new memory module. When the record is not in the new memory module, an error condition may be declared in step 524. Steps 506 through 524 may be repeated several times to update records and process request for records. The contents of the cache memory module may be refreshed after a predetermined time period, after a predetermined number of changes to the unused reserved fields or at some other time. One skilled in the art will appreciate that several of the steps shown in FIG. 5 may be performed in different orders and that the invention is not limited to the particular sequence shown in FIG. 5.

Figure 6:
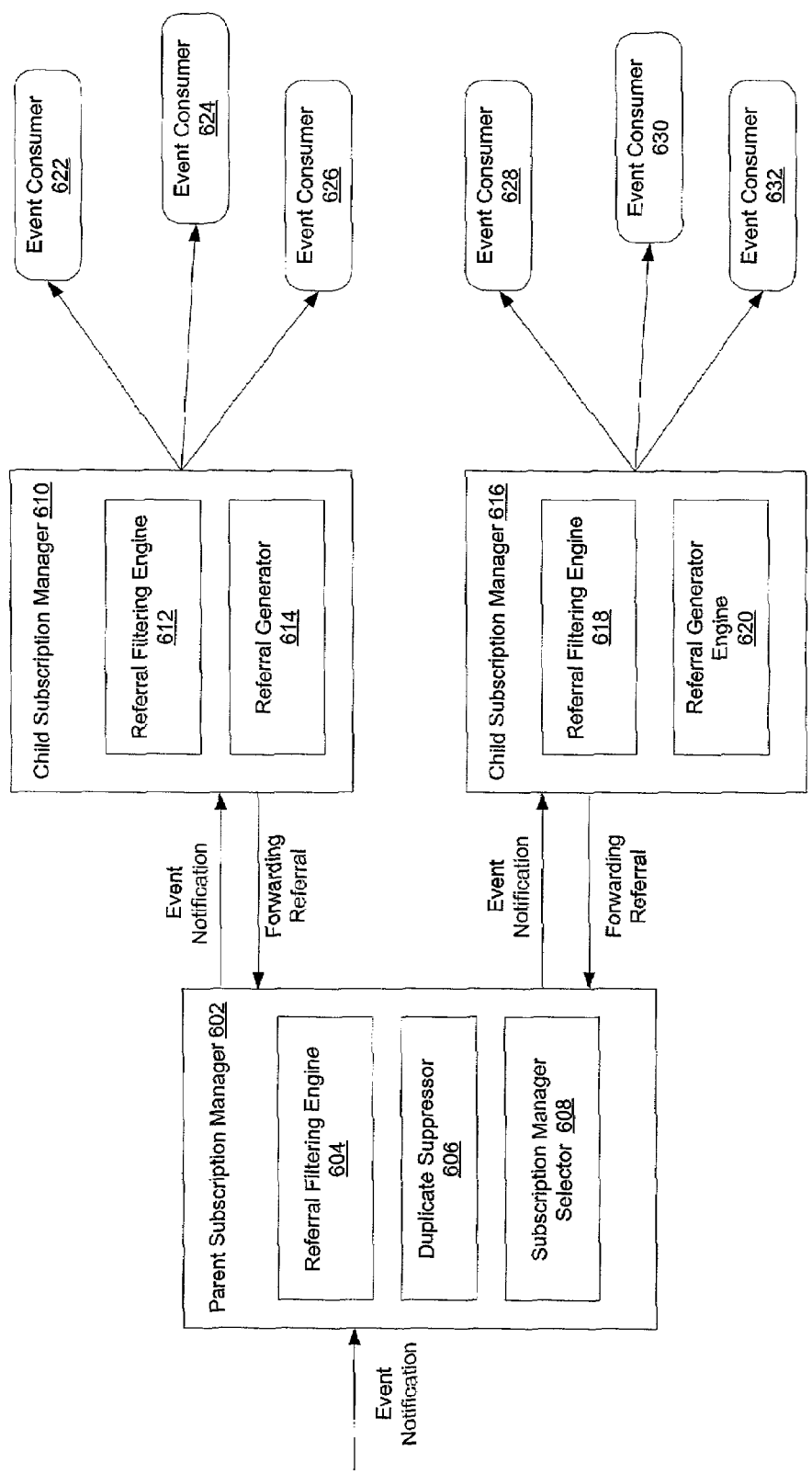
FIG. 6 illustrates a subscription manager network that utilizes summary-based routing to increase network throughput, in accordance with an embodiment of the invention.

FIG. 6 illustrates a subscription manager network that enhances throughput. The subscription manager network shown in FIG. 6 includes a parent subscription manager 602 and two child subscription managers 610 and 616. Parent subscription manager 602 may include a referral filtering engine 604 that filters incoming event notifications so that incoming event notifications are not automatically transmitted to every child subscription manager. A duplicate suppressor 606 may be included to track event notifications and ensure that no more than one copy of an event notification is transmitted to a given child subscription manager. More than one copy of an event notification may be transmitted through a network to aid in timely delivery and reliability. When second and subsequent copies are received at a given node, duplicate suppressor 606 may suppress the transmission of all but the first copy. Event notifications may be stamped with serial numbers or other identifications to facilitate tracking. A subscription manager selector 608 may be included to select child subscription managers based on forwarding referrals. Subscription manager selector 608 will be described in further detail below.

Child subscription managers 610 and 616 may include referral filtering engines 612 and 618 that may be configured to function similarly to referral filtering engine 604. Child subscription managers 610 and 616 also include referral generators 614 and 620. Each referral generator maintains a summary of all locally hosted subscriptions and forwarding referrals from child nodes (not shown). Referral generators 614 and 620 generate forwarding referrals that are transmitted to parent subscription manager 602. Forwarding referrals identify all of the subscriptions of event consumers coupled to the subscription manager. Referral filtering engine 604 may then limit the transmission of event notifications to child subscription managers based on the forwarding referrals. For example, if event consumers 622, 624 and 626 each have subscriptions that do not include a certain news topic, when parent subscription manager 602 receives a corresponding event notification, referral filtering engine 604 filters the event notification and does not transmit the event notification to child subscription manager 610.

The subscription manager shown in FIG. 6 may include one or more other components shown in the previous figures. Moreover, the configuration shown in FIG. 6 may be included in the subscription manager network shown in FIG. 3. Subscription manager selector 608 may include or work in connection with a subscription routing policy to adapt the network to changing subscription needs. For example, when event consumers 626, 628, 630 and 632 all subscribe to a given topic, child subscription managers 610 and 616 may be reconfigured so that child subscription manager 616 transmits event notifications to event consumers 626, 628, 630 and 632.

Subscription routing policy 304 (shown in FIG. 3) may be used to selectively activate and deactivate referral filtering engines and referral generators. For example, when a portion of a subscription manager network is experiencing overload conditions, referral filtering engines and referral generators may be activated in that portion to reduce congestion and increase throughput. Alternatively, in low load conditions, the referral filtering engines and referral generators may be deactivated to reduce processing requirements of the network.

While the invention has been described with respect to specific examples, those skilled in the art will appreciate that there are numerous variations and permutations of the above described systems and techniques that fall within the spirit and scope of the invention as set forth in the appended claims. Moreover, one or more of the separately described subscription manager network configurations may be combined into a single subscription manager network. In alternative embodiments, topic manager networks may have structures and operations similar to that of the disclosed subscription manager networks. Alternative embodiments of the invention may incorporate naming schemes other than URLs. For example, ad-hoc naming schemes that have an associated name resolution may be employed.

We claim:

1. An event notification system for sending event notifications to event consumers that subscribe to topics, the system comprising:

a hierarchical network of topic managers, each topic manager in the hierarchical network of topic managers including a topic update module for updating topics, a distribution module for load balancing the transmission of event notifications within the hierarchal network of topic managers, a creation/deletion module for creating and deleting topics, and a naming module for obtaining a physical machine address associated with a topic, the distribution module performing load balancing based on the use of individual topic managers within the network of topic managers, each topic manger also comprising a processor, a network connection, and computer readable storage media having stored thereon computer executable instructions that, when executed at the processor, cause the hierarchical network of topic managers to:

assign an event notification received from the event source to a topic;

locate a subscription manager associated with the topic the event is assigned to from among a hierarchical multi-path network of subscription managers; and transmit the event notification to the subscription manager associated with the topic the event notification is assigned to;

the hierarchical multi-path network of subscription managers comprising a plurality of subscription managers, at least some of the subscription mangers being connected to one another via a plurality of different physical paths within the hierarchical multi-path network, each of the subscription mangers comprising a processor, a network connection, and a computer readable storage media having stored thereon computer executable instructions that, when executed at the processor, cause the hierarchical multi-path network of subscription managers to:

transmit an event notification to an event consumer at an address and in a format and manner specified in a subscription provided by the event consumer, transmitting including routing the event notification through the group of computer devices from a root subscription manager, via at least two different paths in the hierarchical multi-path network, to a last hop subscription manager, each of the at least two different paths having a different set of subscription managers between the root subscription manager and the last hop subscription manager; and wherein the last hop subscription manger is configured to suppress duplicate copies of the notification such that a single copy of the event notification is transmitted from the last hop subscription manager to the event consumer.

2. The system of claim 1, wherein the hierarchical multi-path network of subscription managers comprises a group of computer devices coupled together in a hierarchical manner, and wherein transmitting the event notification to an event consumer comprises transmitting the event notification to the root subscription manager.

3. The system of claim 2, wherein routing the event notification through the group of computer devices from a root subscription manager to a last hop subscription manager comprises routing the event notification through the group of computer devices from the root subscription manager to a last hop subscription manager according to a routing policy.

4. The system of claim 2, wherein the group of computer devices are geographically dispersed and the event consumer subscriptions are assigned based on locations of the event consumers, characteristics of interconnection links and locations of the computer devices in the group of computer devices.

5. The system of claim 1, wherein the group of computer devices are geographically dispersed and the event consumer subscriptions are assigned based on load conditions of the computer devices in the group of computer devices.

6. The system of claim 1, wherein the group of computer devices are geographically dispersed and the event consumer subscriptions are assigned based on load conditions of interconnecting media.

7. The system of claim 1, further including a name server coupled to the topic manager and that stores physical addresses corresponding to universal resource locators used to identify the event consumers.

8. The system of claim 7, wherein the name server comprises a group of computer devices that each resolve a portion of a universal resource locator.

9. The system of claim 1, wherein a format specified in a subscription includes an identification of a language.

10. The computer program product of claim 1, further comprising the step of identifying the at least two different paths on the basis of loading conditions between connected subscription managers within the hierarchical multi-path network of subscription managers.

11. A method of delivering event notifications to a plurality of event consumers connected to a hierarchical multi-path network of subscription managers via a wide area network, at least some of the subscription mangers being connected to one another via a plurality of different paths within the hierarchical multi-path network of subscription managers, the method comprising:
 (a) receiving at the hierarchical multi-path network of subscription managers subscription information comprising an identification of at least one topic to which an event consumer intends to subscribe; an identification of at least one delivery address to which the event notifications will be delivered; and
 delivery information that determines how the event notifications will be delivered;
 (b) receiving at the hierarchical multi-path network of subscription managers an event notification assigned to a topic, the event notification received from a hierarchical network of topic managers;
 (c) determining a root subscription manager, wherein the root subscription manager feeds the event notification to at least one other subscription manager included in the hierarchical multi-path network of subscription managers;
 (d) identifying a set of the plurality of event consumers that have subscribed to the topic;
 (e) routing the event notification from the root subscription manager, via at least two different paths in the hierarchical multi-path network, to a last hop subscription manager, each of the at least two different paths having a different set of subscription managers between the root subscription manager and the last hop subscription manager; and
 (f) a processor at the last hop subscription manager suppressing duplicate copies of the event notification such that a single copy of the event notification is transmitted from the last hop subscription manager to the event consumer.

12. The method of claim 11, wherein the delivery information includes security policy information for delivering event notifications to event consumers.

13. The method of claim 12, wherein the security policy information includes encryption information.

14. The method of claim 11, wherein the subscription information includes subscription duration information.

15. The method of claim 11, wherein the subscription information includes the locations of event consumers.

16. The method of claim 11, wherein the at least one delivery address comprises at least two delivery addresses identified in a priority order.

17. The method of claim 11, wherein routing the event notification from the root subscription manager to at least on other subscription manager comprises hierarchically routing the event notification through a group of subscription manager computer devices.

18. The method of claim 17, wherein the computer devices comprise a first computer device that contains first subscription information for a first event consumer and a second computer device that contains second subscription information for a second event consumer.

19. The method of claim 18, further including:
 (i) transferring the first subscription information to the second computer device in response to a change in a load condition.

20. The method of claim 18, further including:
 (i) transferring the first subscription information to the second computer device in response to an error condition.

21. The method of claim 18, further including:
 (i) storing the first subscription information at the second computer device and storing the second subscription information at the first computer device.

22. A computer program product for use in an event notification system, the computer program product implementing a method of routing event notifications to a plurality of subscribers, the computer program product comprising one more computer storage media having stored thereon computer-executable instructions that, when executed at one or more processors, cause the event notification system to perform the following steps:
 (1) receive from each of the plurality of subscribers subscription information that includes, for each respective subscriber, a topic to which the respective subscriber intends to receive corresponding event notifications from; at least one delivery address to which the event notifications will be delivered; and delivery information that determines how the event notifications will be delivered;
 (2) assign the subscription information for each respective subscriber to a root subscription manger from among a hierarchical multi-path network of subscription managers on the basis of the subscription information, at least some of the subscription mangers being connected to one another via a plurality of different physical paths within the hierarchical multi-path network of subscription managers;
 (3) receive an event notification from a hierarchical network of topic managers and correlating the event notification to one of a plurality of topics;
 (4) transmit the event notification through the hierarchical multi-path network of subscription managers to subscribers that have subscribed to the one of the plurality of topics, transmitting including routing the event notification through the group of computer devices from a root subscription manager, via at least two different oaths in the hierarchical multi-path network, to a last hop subscription manager, each of the at least two different paths having a different set of subscription managers between the root subscription manager and the last hop subscription manager; and
 (5) suppress duplicate copies of the event notification at the last hop subscription manger such that a single copy of the event notification is transmitted from the last hop subscription manager to the event consumer.

23. The program computer product of claim 22, wherein step (1) comprises the step of receiving delivery information that identifies a geographic region in which a respective subscriber besides; and wherein step (2) comprises the step of assigning a subscription for the respective subscriber to a subscription manager that is located in the geographic region.

24. The computer program product of claim 22, wherein step (2) comprises assigning a subscription for the respective subscriber to a subscription manager based on capacities of the subscription managers.

25. The computer program product of claim 22, wherein step (4) comprises the step of transmitting the event notification to each respective subscriber in accordance with the delivery information for that respective subscriber.

26. The computer program product of claim 25, wherein step (4) comprises the step of transmitting the event notification to each respective subscriber in a language selected by each respective subscriber, such that different subscribers receive the same event notification in a different language.

27. The computer program product of claim 25, wherein step (4) comprises the step of transmitting the event notification to each respective subscriber using a security mechanism selected by each respective subscriber, such that different subscribers receive the same event notification according to a different security mechanism.

28. A method of routing event notifications to a subscriber in an event notification system, the event notification including a plurality of subscribers, a root subscription manager, and a last hop subscription manager, each of the plurality of subscription managers including a processor and the last hop subscription manager including a processor, the method comprising the steps of:

(1) receiving from each of the plurality of subscribers subscription information that includes, for each respective subscriber, a topic to which the respective subscriber intends to receive corresponding event notifications from; at least one delivery address to which the event notifications will be delivered; and delivery information that determines how the event notifications will be delivered;

(2) assigning the subscription information for each respective subscriber to a subscription manger from among a hierarchical multi-path network of hierarchically arranged subscription managers on the basis of the subscription information, at least some of the subscription mangers being connected to one another via a plurality of different paths within the hierarchical multi-path network of subscription managers;

(3) receiving an event notification from a hierarchical network of topic managers and correlating the event notification to one of a plurality of topics;

for at least one subscriber in the plurality of subscribers that has not subscribed to the event notifications:

(4) the processor at the at least one subscriber initiating transmission of the event notification through the hierarchical multi-path network of hierarchically arranged subscription managers to the subscriber such that some event notifications which are not subscribed to are nonetheless transmitted to the subscriber, transmitting including routing a copy of the event notification through the hierarchical multi-path network of subscription managers from a root subscription manager, via at least two different physical paths within the hierarchical multi-path network of subscription managers, to a last hop subscription manager for delivery to the subscriber, each of the at least two different physical paths including different intermediary subscription managers between the root subscription manager and the last hop subscription manager;

(5) the processor at the last hop subscription manager suppressing duplicate copies of the event notification such that a single copy of the event notification is transmitted from the last hop subscription manager to the subscriber; and (6) filtering the event notification at the subscriber in accordance with subscription information of the subscriber.

\* \* \* \* \*